(12) United States Patent
Yamaguchi et al.

(10) Patent No.: US 9,182,267 B2
(45) Date of Patent: Nov. 10, 2015

(54) CAPACITIVE LEVEL GAUGE (75) Inventors: Hiroaki Yamaguchi, Tokyo (JP);
Yuichiro Kamino, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 299 days.

(21) Appl. No.: 13/818,829

(22) PCT Filed: May 24, 2011

(86) PCT No.: PCT/JP2011/061862
§ 371 (c)(1),
(2), (4) Date: Feb. 25, 2013

(87) PCT Pub. No.: WO2012/029366
PCT Pub. Date: Mar. 8, 2012

(65) Prior Publication Data
US 2013/0152676 A1    Jun. 20, 2013

(30) Foreign Application Priority Data

Sep. 3, 2010   (JP) ................................. 2010-197819

(51) Int. Cl.
*G01F 23/26*   (2006.01)
(52) U.S. Cl.
CPC ............ *G01F 23/263* (2013.01); *G01F 23/266* (2013.01); *G01F 23/268* (2013.01)
(58) Field of Classification Search
CPC .............................. G01F 23/263; G01F 23/268
USPC ...................................................... 73/304 C
See application file for complete search history.

(56) References Cited

U.S. PATENT DOCUMENTS 3,050,999 A     8/1962  Edwards
3,988,668 A  * 10/1976  Bowers ......................... 324/690
(Continued)

FOREIGN PATENT DOCUMENTS

DE       12 23 573       8/1966
EP       1 754 961       2/2007
(Continued)

OTHER PUBLICATIONS

International Search Report issued Aug. 30, 2011 in International (PCT) Application No. PCT/JP2011/061862.
(Continued)

*Primary Examiner* — John Fitzgerald
*Assistant Examiner* — Truong Phan
(74) *Attorney, Agent, or Firm* — Wenderoth, Lind & Ponack, L.L.P.

(57) ABSTRACT

A fuel gauge (15) provided with an inner structural body (27) that is formed of an insulator; an outer structural body (23) that is formed of an insulator and disposed on the outer circumference side of the inner structural body (27) over the entire circumference thereof; an inner electrode (29) that is attached to an outer circumferential surface of the inner structural body (27); and an outer electrode (25) that is attached to an inner circumferential surface of the outer structural body (23). The fuel guage measures the capacitance between the inner electrode and the outer electrode and detects the level of fuel that exists between the inner electrode and the outer electrode. The outer structural body is provided with a plurality of outer through-holes (31) that allow electric charge to move from an outer circumferential surface thereof to the outer electrode.

6 Claims, 5 Drawing Sheets

(56) References Cited

U.S. PATENT DOCUMENTS 5,477,727 A * 12/1995 Koga .......................... 73/304 C
2004/0194545 A1 * 10/2004 Hauzeray .................... 73/304 C

FOREIGN PATENT DOCUMENTS

| JP | 60-606 | 1/1985 |
| JP | 63-157018 | 6/1988 |
| JP | 5-322629 | 12/1993 |
| JP | 2001271718 | * 3/2000 |
| JP | 2001-271718 | 10/2001 |
| JP | 2002-31559 | 1/2002 |
| JP | 2005-127724 | 5/2005 |
| JP | 4104527 | 6/2008 |
| RU | 62 457 | 4/2007 |
| RU | 123 942 | 1/2013 |
| SU | 449317 | 11/1974 |

OTHER PUBLICATIONS

Decision to Grant a Patent issued Mar. 18, 2014 in corresponding Japanese patent application No. 2010-197819 with English translation.

Extended European Search Report issued Jul. 4, 2014 in corresponding European patent application No. 11821384.2.

Notice of Allowance issued Aug. 11, 2014 in corresponding Russian patent application No. 2013107956 (with English translation).

* cited by examiner

CAPACITIVE LEVEL GAUGE

BACKGROUND OF THE INVENTION

1. Technical Field

The present invention relates to a capacitive level gauge.

2. Description of the Related Art

In transportation equipment, such as an aircraft or the like, a capacitive level gauge has been widely employed as a fuel gauge that detects the remaining amount of fuel in a fuel tank.

This fuel gauge has two cylindrical electrodes that are disposed so that the fuel can freely enter between them, and detects the remaining amount of fuel by measuring the capacitance between the electrodes.

In the related art, these electrodes are, for example, made of metal and also serve as structural bodies, as disclosed in Japanese Unexamined Patent Application, Publication No. 2002-31559 (JP 2002-31559).

In recent years, in the field of transportation equipment such as aircraft or the like, composite materials, such as reinforced plastic or the like, are beginning to be used in components of wings and fuselages of the aircraft body for the purpose of achieving weight reduction and for a resultant performance enhancement. As part of this, in order to achieve weight reduction, to enhance environmental resistance, and so forth also for a fuel gauge, the use of a gauge in which two cylindrical structural bodies thereof are formed by using a composite-material plastic and thin electrode layers are formed on opposing circumferential surfaces thereof is becoming more common.

SUMMARY OF THE INVENTION

1. Technical Problem

Because the cylindrical structural bodies are in contact with the fuel, a streaming electrification phenomenon occurs between the fuel and the cylindrical structural bodies when the fuel flows. For example, in the case in which a glass-fiber reinforced plastic (hereinafter, referred to as "GFRP") is employed in the cylindrical structural bodies, because GFRP is an insulator, generated static electricity accumulates thereon, that is, so-called electrification occurs.

In addition, because the electrodes exist on the surfaces on one side of the cylindrical structural bodies, an electrical double layer is formed therebetween, and electrification with a large amount of static electricity occurs on the surfaces of the cylindrical structural bodies opposite from the electrodes.

If an electric discharge occurs when such electrification with a large amount of static electricity occurs, because it has sufficient capability to ignite the fuel, there is a risk of the fuel being ignited due to sparks generated in association with the electric discharge.

Note that, if the cylindrical structural bodies are formed of a conductive carbon-fiber reinforced plastic (hereinafter, described as "CFRP"), it is possible to sufficiently suppress the electrification.

The present invention has been conceived in order to solve the above-described problems, and an object thereof is to provide a capacitive level gauge that is capable of suppressing electrification even if an insulator is employed in a structural body.

2. Solution to the Problem

In order to achieve the above-described object, the present invention employs the following solutions.

An aspect of the present invention is a capacitive level gauge including an inner structural body that is formed of an insulator and has a columnar shape; an outer structural body that has a hollow-cylindrical shape and is formed of an insulator and disposed on the outer circumference side of the inner structural body over the entire circumference thereof and at a distance therefrom; an inner electrode that is attached to an outer circumferential surface of the inner structural body; and an outer electrode that is attached to an inner circumferential surface of the outer structural body, which measures the capacitance between the inner electrode and the outer electrode and detects the level of a measurement object that exists between the inner electrode and the outer electrode, wherein the outer structural body is provided with a plurality of outer communicating portions that allow an electric charge to move from an outer circumferential surface thereof to the outer electrode.

In the capacitive level gauge according to this aspect, because the outer circumferential surface of the outer structural body formed of the insulator is in direct contact with the measurement object, electrification occurs thereon due to a streaming electrification phenomenon or the like caused by a flow of the measurement object. In addition, because the outer electrode exists at the inner circumferential surface of the outer structural body, an electrical double layer is formed, and electrification with a large amount of static electricity may occur at the outer circumferential surface of the outer structural body.

Because the outer structural body is provided with the plurality of outer communicating portions that allow electric charge to move from the outer circumferential surface thereof to the outer electrode, the electric charge from the electrification of the outer circumferential surface of the outer structural body moves to the outer electrode by passing through the outer communicating portions and moves out of the system via the outer electrode.

Because it is possible to suppress electrification in this way even if an insulator is employed in the outer structural body, it is possible to reduce the possibility of electrification due to static electricity causing an electric discharge. Accordingly, because it is possible to prevent the measurement object from being ignited even if it is combustible, the capacitive level gauge can be employed, for example as a fuel gauge for an aircraft fuel tank.

In the above-described aspect, the inner structural body may have a hollow structure inside of which the measurement object exists; and the inner structural body may be provided with a plurality of inner communicating portions that allow electric charge to move from an inner circumferential surface thereof to the inner electrode.

In the above-described aspect, the inner structural body may have a columnar shape and be a solid structure or a hollow structure. When the inner structural body has a hollow structure in order to achieve weight reduction thereof, because the measurement object exists in the hollow portion of the inner structural body, electrification occurs at the inner circumferential surface of the inner structural body. However, because the amount of the measurement object that exists in the hollow portion of the inner structural body is significantly smaller in comparison to that at the outer circumferential surface of the outer structural body, it is conceivable that the electrification does not reach a problematic level.

In the case in which the magnitude of the electrification reaches a problematic level, the inner structural body should be provided with the plurality of inner communicating portions that allow the electric charge to move from the inner circumferential surface to the inner electrode.

By doing so, because the electric charge from the electrification of the inner circumferential surface of the inner structural body moves to the inner electrode by passing through the inner communicating portions and moves out of the system via the inner electrode, it is possible to suppress electrification even if an insulator is employed in the inner structural body. Accordingly, because the possibility of electrification of the inner circumferential surface of the inner structural body due to static electricity causing electric discharge can be reduced, it is possible to prevent the measurement object from being ignited even if it is combustible.

In the above-described aspect, the outer communicating portions may be formed of outer through-holes that penetrate through to the outer electrode from the outer circumferential surface of the outer structural body.

By doing so, the static electricity generated at the outer circumferential surface of the outer structural body does not cause electrification at the outer circumferential surface but moves to the outer electrode by passing through the outer through-holes; therefore, it is possible to suppress electrification at the outer circumferential surface of the outer structural body.

In the above-described aspect, the outer communicating portions may be formed of outer conductors that reach the outer electrode from the outer circumferential surface of the outer structural body.

By doing so, the static electricity generated at the outer circumferential surface of the outer structural body does not cause electrification at the outer circumferential surface but moves to the outer electrode by passing through the outer conductors; therefore, it is possible to suppress electrification at the outer circumferential surface of the outer structural body.

The outer conductors may be formed by filling the outer through-holes with a conductive material, or may be formed by, for example, piercing the outer structural body with rod-like conductors made of metal or the like.

In the above-described aspect, the inner communicating portions may be formed of inner through-holes that penetrate through to the inner electrode from the inner circumferential surface of the inner structural body.

By doing so, the static electricity generated at the inner circumferential surface of the inner structural body does not cause electrification at the inner circumferential surface but moves to the inner electrode by passing through the inner through-holes; therefore, it is possible to suppress electrification at the inner circumferential surface of the inner structural body.

In the above-described aspect, the inner communicating portions may be formed of inner conductors that reach the inner electrode from the inner circumferential surface of the inner structural body.

By doing so, the static electricity generated at the inner circumferential surface of the inner structural body does not cause electrification at the inner circumferential surface but moves to the inner electrode by passing through the inner conductors; therefore, it is possible to suppress electrification at the inner circumferential surface of the inner structural body.

The inner conductors may be formed by filling the inner through-holes with a conductive material, or may be formed by, for example, piercing the inner structural body with rod-like conductors made of metal or the like.

3. Advantageous Effects of the Invention

With a capacitive level gauge of the present invention, because an outer structural body is provided with a plurality of outer communicating portions that allow electric charge to move from an outer circumferential surface thereof to an outer electrode, electric charge from electrification of the outer circumferential surface of the outer structural body moves to the outer electrode by passing through the outer communicating portion and moves out of the system via the outer electrode.

Because it is possible to suppress electrification in this way even if an insulator is employed in the outer structural body, it is possible to reduce the possibility of electrification due to static electricity causing an electric discharge. Accordingly, because it is possible to prevent the measurement object from being ignited even if it is combustible, the present invention can be employed as a fuel gauge for an aircraft fuel tank.

DETAILED DESCRIPTION OF THE INVENTION

An embodiment of the present invention will be described with reference to FIGS. 1 to 9.

Figure 1:
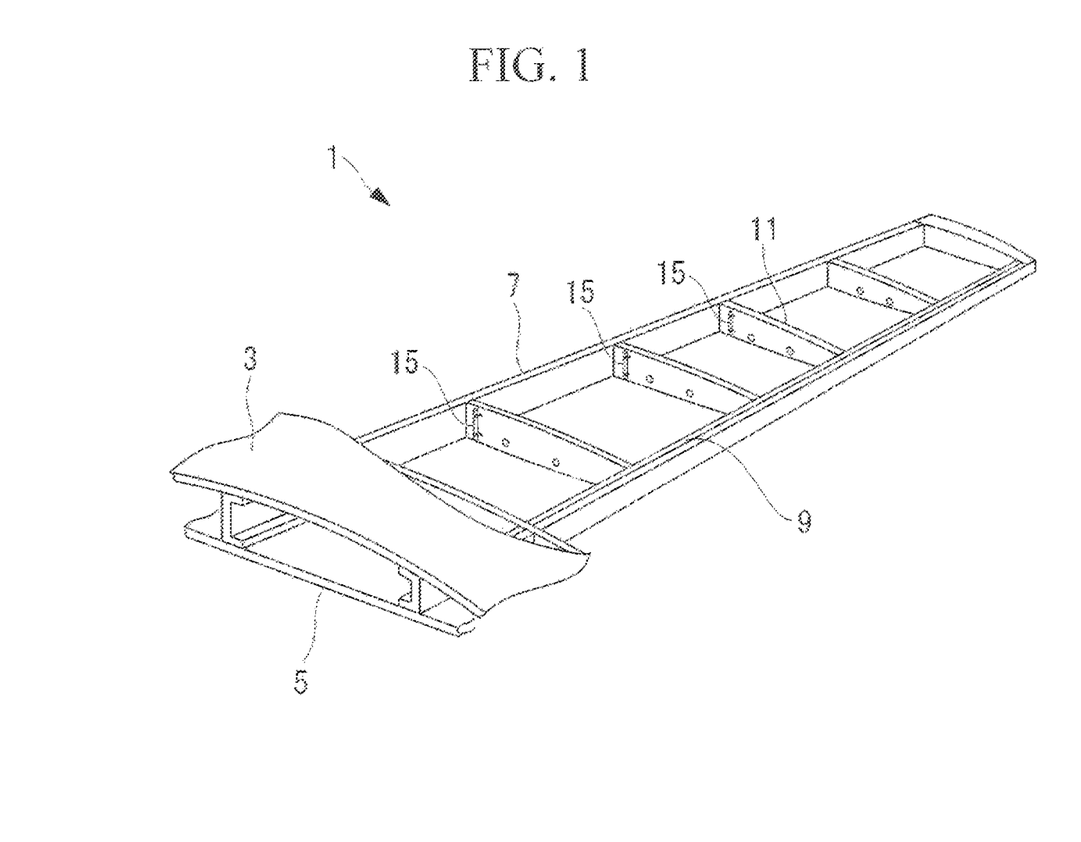
FIG. 1 is a partial cut-away perspective view showing the configuration of a main wing provided with a fuel gauge according to an embodiment of the present invention.

FIG. 1 is a partial cut-away perspective view showing a main wing of an aircraft.

A main wing 1 is provided with an upper skin 3, a lower skin 5, a front spar 7, a rear spar 9, and a plurality of ribs 11.

The upper skin 3 and the lower skin 5 form the external shape of the main wing 1; are thin plates also serving as aerodynamic surfaces; and bear, together with the front spar 7, the rear spar 9, and a stringer (not shown), components of a tensile load and a compressive load that act on the main wing 1.

As shown in FIG. 1, the front spar 7 and the rear spar 9 are structural members that extend in the wing-length direction of the main wing 1 and are the members disposed between the upper skin 3 and the lower skin 5.

A plurality of stringers, which are auxiliary members extending in the wing-length direction of the main wing 1, are disposed on an inner surface of the upper skin 3 or the lower skin 5 between the front spar 7 and the rear spar 9.

As shown in FIG. 1, the ribs 11 are structural members that extend in the wind-span direction of the main wing 1 and are disposed between the upper skin 3 and the lower skin 5. In other words, the ribs 11 are structural members that extend in a direction substantially perpendicular to the front spar 7 and the rear spar 9 and are plate-like members formed having the cross-sectional shape of the main wing 1.

In the main wing 1, a portion surrounded by the front spar 7, the rear spar 9, the upper skin 3, and the lower skin 5 is employed as a fuel tank 13 that stores fuel. The fuel tank 13 is known as an integral tank (integral tank) because the body structural parts themselves serve as a container.

A fuel pipe (not shown) that receives and supplies jet fuel, a plurality of fuel gauges (capacitive level gauges) 15 that detect the fuel level, wires (not shown) for the fuel gauges 15, and so forth are provided on the inner side of the fuel tank 13.

Figure 2:
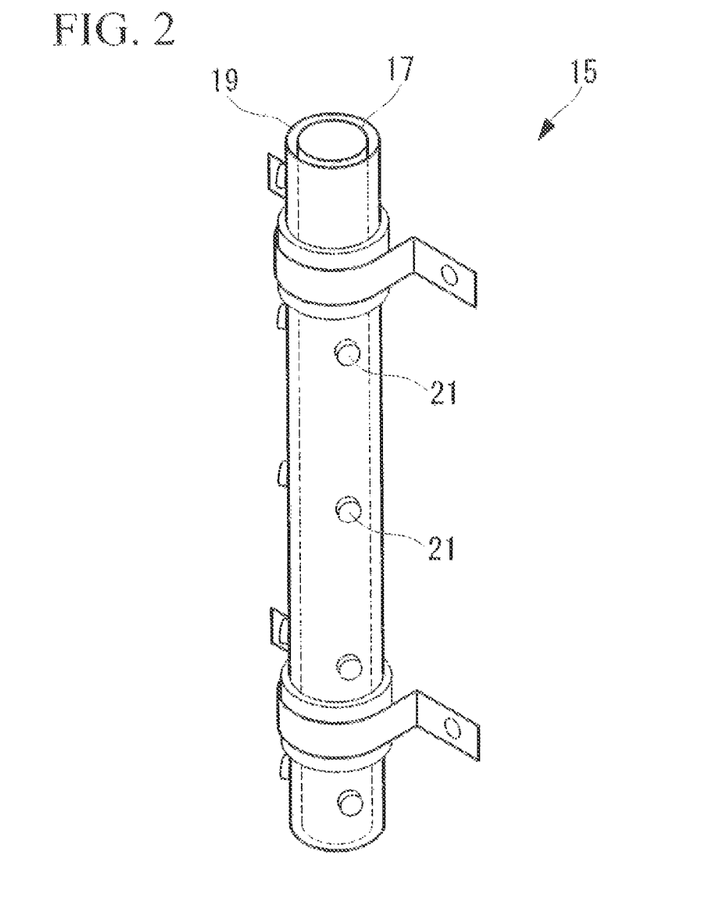
FIG. 2 is a perspective view for describing, in outline, the configuration of the fuel gauge in FIG. 1.
Figure 3:
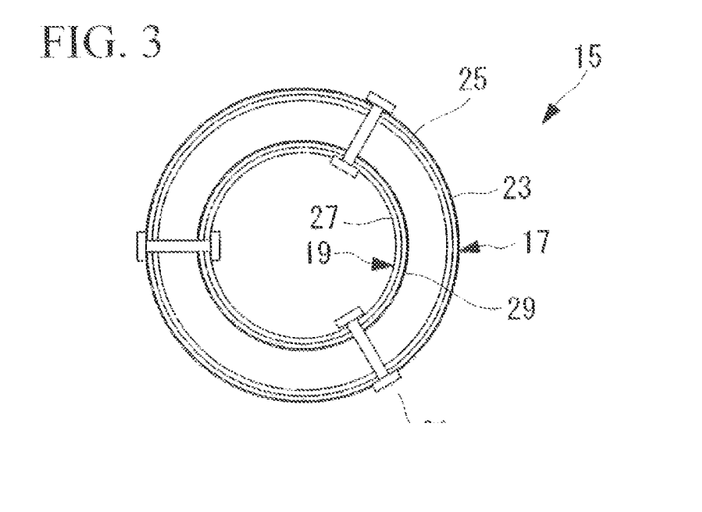
FIG. 3 is a plan view of the fuel gauge in FIG. 2.
Figure 4:
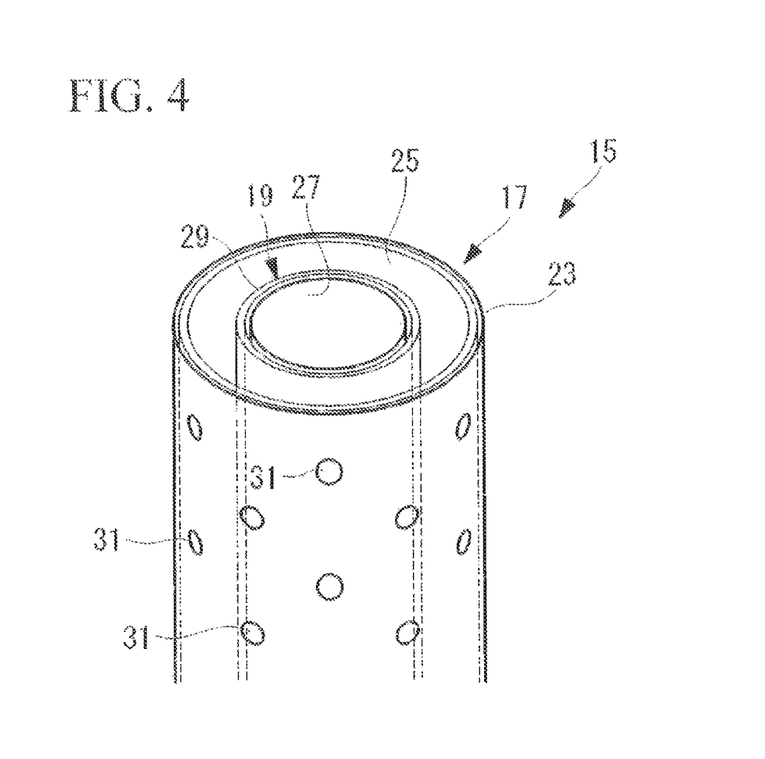
FIG. 4 is a partial perspective view showing an upper portion of the fuel gauge in FIG. 2
Figure 5:
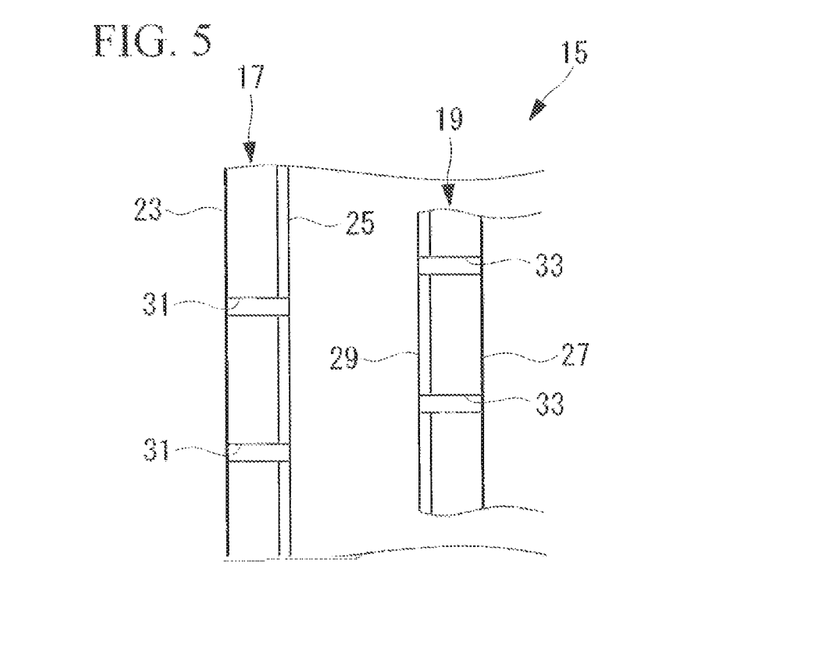
FIG. 5 is a partial longitudinal sectional view showing a portion of a longitudinal cross-section of the fuel gauge in FIG. 2.

FIG. 2 is a perspective view for describing, in outline, the configuration of the fuel gauge 15. FIG. 3 is a plan view of the fuel gauge 15. FIG. 4 is a partial perspective view showing the upper portion of the fuel gauge 15. FIG. 5 is a partial longitudinal sectional view showing a portion of a longitudinal cross-section of the fuel gauge 15.

The fuel gauge 15 is provided with an outer-electrode structural portion 17 having a substantially hollow cylindrical shape, an inner-electrode structural portion 19 that has a substantially hollow cylindrical shape and that is disposed inside the outer-electrode structural portion 17 so as to have substantially the same axial center, and connecting members 21 that connect the outer-electrode structural portion 17 and the inner-electrode structural portion 19.

As shown in FIGS. 3 and 4, the outer-electrode structural portion 17 is formed of an outer structural body 23 that has a substantially hollow cylindrical shape and that ensures sufficient structural strength and an outer electrode 25 that is attached to an inner circumferential surface of the outer structural body 23 over substantially the entire surface thereof. Note that the outer electrode 25 needs to be attached only to an area where measurement needs to be performed and may be attached to a portion of the inner circumferential surface of the outer structural body 23.

The outer structural body 23 is formed of a GFRP (insulator) having insulating properties. The outer structural body 23 has, for example, an outer diameter of approximately 25 mm and a thickness of slightly greater than 0.5 mm. The length of the outer structural body 23 is set to be sufficient to substantially cover the height of the fuel tank 13.

The outer electrode 25 is a metallic thin film and is attached to the inner circumferential surface of the outer structural body 23.

As shown in FIGS. 3 and 4, the inner-electrode structural portion 19 is formed with an inner structural body 27 that has a substantially hollow cylindrical shape and that ensures sufficient structural strength and an inner electrode 29 that is attached to an outer circumferential surface of the inner structural body 27 over substantially the entire surface thereof. Note that the inner electrode 29 needs to be attached only to an area where measurement needs to be performed and may be attached to a portion of the outer circumferential surface of the inner structural body 27.

The inner structural body 27 is formed of a GFRP (insulator) having insulating properties. The inner structural body 27 has, for example, an outer diameter of slightly less than 20 mm and a thickness of slightly greater than 0.5 mm. The length of the inner structural body 27 is set to be similar to that of the outer structural body 23.

The inner electrode 29 is a metallic thin film and is attached to the outer circumferential surface of the inner structural body 27.

Note that the fiber-reinforced plastic that forms the outer structural body 23 and the inner structural body 27 may be a fiber-reinforced plastic that employs an epoxy resin as a base material and employs polyester fibers, cotton fibers, or nylon fibers as reinforcing fibers, or may be a fiber-reinforced plastic that employs a polyimide resin as a base material and employs glass fibers, polyester fibers, cotton fibers, or nylon fibers as reinforcing fibers; it is not particularly limited.

The connecting members 21 are formed of insulators. The connecting members 21 are provided at multiple locations in the height direction as well as at multiple locations, for example, three locations, in the circumferential direction at substantially the same height.

As shown in FIG. 3, the connecting members 21, in plan view, are attached at the three locations in the circumferential directions at 120° intervals so as to maintain the space between the inner-electrode structural portion 19 and the outer-electrode structural portion 17, and hold the inner-electrode structural portion 19 in the outer-electrode structural portion 17 so that both have substantially the same axial center.

As shown in FIGS. 4 and 5, the outer-electrode structural portion 17 is provided with a plurality of outer through-holes (outer communicating portions) 31 that penetrate from the outer circumferential surface of the outer structural body 23 to an inner circumferential surface of the outer electrode 25. The outer through-holes 31 allow electric charge to move from the outer circumferential surface of the outer structural body 23 to the outer electrode 25.

As shown in FIG. 5, the inner-electrode structural portion 19 is provided with a plurality of inner through-holes (inner communicating portions) 33 that penetrate from the inner circumferential surface of the inner structural body 27 to the outer circumferential surface of the inner electrode 29.

The outer through-holes 31 and the inner through-holes 33 have inner diameters of substantially 2 mm and are drilled substantially horizontally in substantially radial directions. The inner through-holes 33 allow electric charge to move from the inner circumferential surface of the inner structural body 27 to the inner electrode 29.

The spacing between adjacent outer through-holes 31 or inner through-holes 33 is set at about 18 mm. If the spacing becomes larger, the movement of the electric charge from the outer circumferential surface of the outer structural body 23 to the outer electrode 25 or from the inner circumferential surface of the inner structural body 27 to the inner electrode 29 becomes insufficient. In addition, if the spacing becomes smaller, the strength of the outer structural body 23 or the inner structural body 27 decreases.

The inner diameter, number, spacing, and so forth of the outer through-holes 31 and the inner through-holes 33 are selected in consideration of these factors.

In this embodiment, the outer through-holes 31 or the inner through-holes 33 are processed after forming the outer-electrode structural portion 17 or the inner-electrode structural portion 19. Because of this, in order for them to reliably reach the outer electrode 25 or the inner electrode 29, these through-holes are formed so as to penetrate through also the outer electrode 25 or the inner electrode 29.

Figure 6:
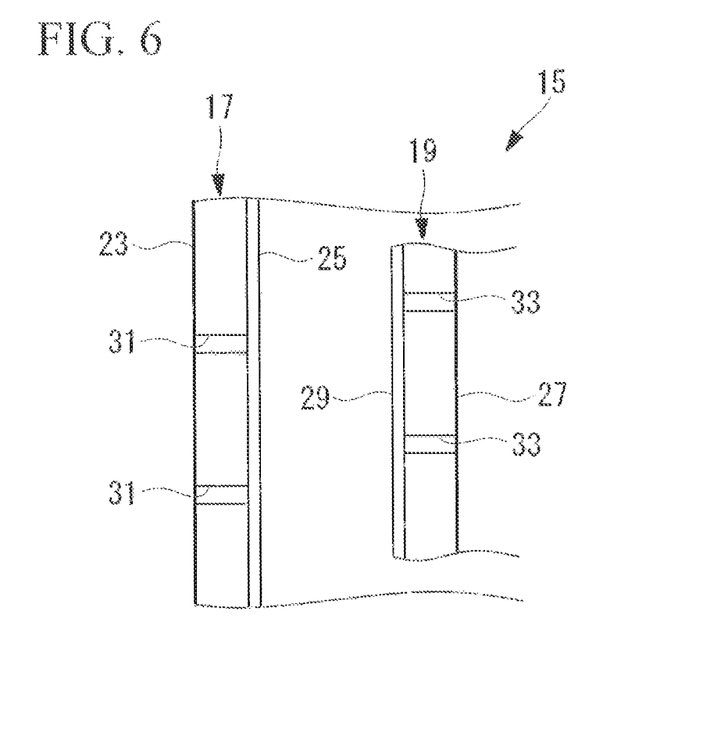
FIG. 6 is a partial longitudinal sectional view showing a portion of a longitudinal cross-section of a fuel gauge according to the embodiment of the present invention in another form.

In the case in which the outer through-holes 31 or the inner through-holes 33 are processed in the outer structural body 23 or the inner structural body 27, for example, before attaching the outer electrode 25 or the inner electrode 29, the outer through-holes 31 or the inner through-holes 33 may be formed so as to penetrate through only the outer structural body 23 or the inner structural body 27, as shown in FIG. 6.

By doing so, the outer electrode 25 or the inner electrode 29 becomes continuous, and also exists at a bottom portion of the outer through-holes 31 or the inner through-holes 33; therefore, it becomes easier to make the electric charge, which moves through the outer through-holes 31 or the inner through-holes 33, move out of the system.

Figure 7:
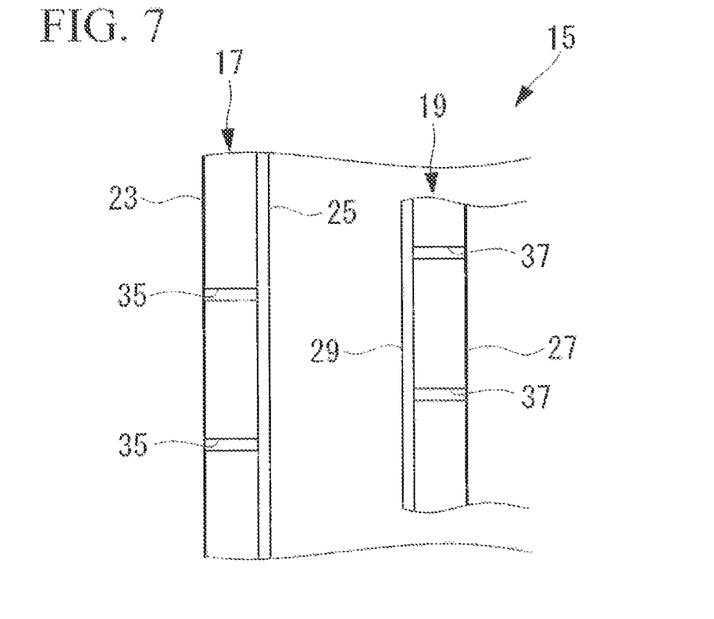
FIG. 7 is a partial longitudinal sectional view showing a portion of a longitudinal cross-section of a fuel gauge according to the embodiment of the present invention in yet another form.

In addition, as shown in FIG. 7, instead of the outer through-holes 31 or the inner through-holes 33, outer conductors 35 or inner conductors 37, which are metallic rod-like pieces, may be provided so as to pierce through the outer structural body 23 or the inner structural body 27 until reaching the outer electrode 25 from the outer circumferential surface of the outer structural body 23 or the inner electrode 29 from the inner circumferential surface of the inner structural body 27.

By doing so, static electricity generated at the outer circumferential surface of the outer structural body 23 or the inner circumferential surface of the inner structural body 27 moves to the outer electrode 25 or the inner electrode 29 via the outer conductors 35 or the inner conductors 37.

The outer conductors 35 or the inner conductors 37 may be formed by filling the outer through-holes 31 or the inner through-holes 33 with a conductive material.

In addition, when forming the outer conductors 35 or the inner conductors 37, portions having continuous conductivity in the thickness direction may be formed.

Next, the operation of the fuel gauge 15 configured as described above will be described.

Because a space, having a doughnut-shaped cross-section, formed between the outer-electrode structural portion 17 and the inner-electrode structural portion 19 in the fuel gauge 15 is open at the top and bottom ends, the fuel stored inside the fuel tank 13 enters this space from the bottom end thereof until the level thereof becomes the same as the fuel level. Because a gaseous atmosphere having a permittivity different from the fuel exists in a portion of this space above the fuel, the fuel level can be detected by measuring the capacitance between the outer electrode 25 and the inner electrode 29.

When movement, etc. of the fuel occurs due to a change in bearing, fuel consumption, fuel supply, or the like associated with the flight of the aircraft, static electrification due to streaming electrification or the like occurs at the outer circumferential surface of the outer structural body 23, the outer electrode 25, the inner electrode 29, and the inner circumferential surface of the inner structural body 27, which are formed of the insulators.

The electric charge caused by the static electrification at the outer electrode 25 and the inner electrode 29 moves out of the system by passing through the outer electrode 25 and the inner electrode 29.

On the other hand, because the outer structural body 23 and the inner structural body 27 are formed of insulators, electrification occurs at the outer circumferential surface of the outer structural body 23 and the inner circumferential surface of the inner structural body 27 due to the streaming electrification phenomenon or the like. In addition, because the outer-electrode structural portion 17 and the inner-electrode structural portion 19 form an electrical double layer, electrification with a large amount of static electricity may occur at the outer circumferential surface of the outer structural body 23 and the inner circumferential surface of the inner structural body 27.

Electric charge from electrification of the outer circumferential surface of the outer structural body 23 moves to the outer electrode 25 by passing through the outer through-holes 31 and moves out of the system via the outer electrode 25. On the other hand, electric charge from electrification of the inner circumferential surface of the inner structural body 27 moves to the inner electrode 29 by passing through the inner through-holes 33 and moves out of the system via the inner electrode 29.

Because it is possible to suppress electrification in this way even if the outer structural body 23 and the inner structural body 27 are formed of insulators, it is possible to reduce the possibility of electrification due to static electricity causing an electric discharge, and it is possible to prevent the fuel from being ignited.

The relationship between the fuel gauge 15 of this embodiment and a fuel gauge 15 without the outer through-holes 31, in terms of the discharge intensity, will be described by using FIGS. 8 and 9.

Figure 8:
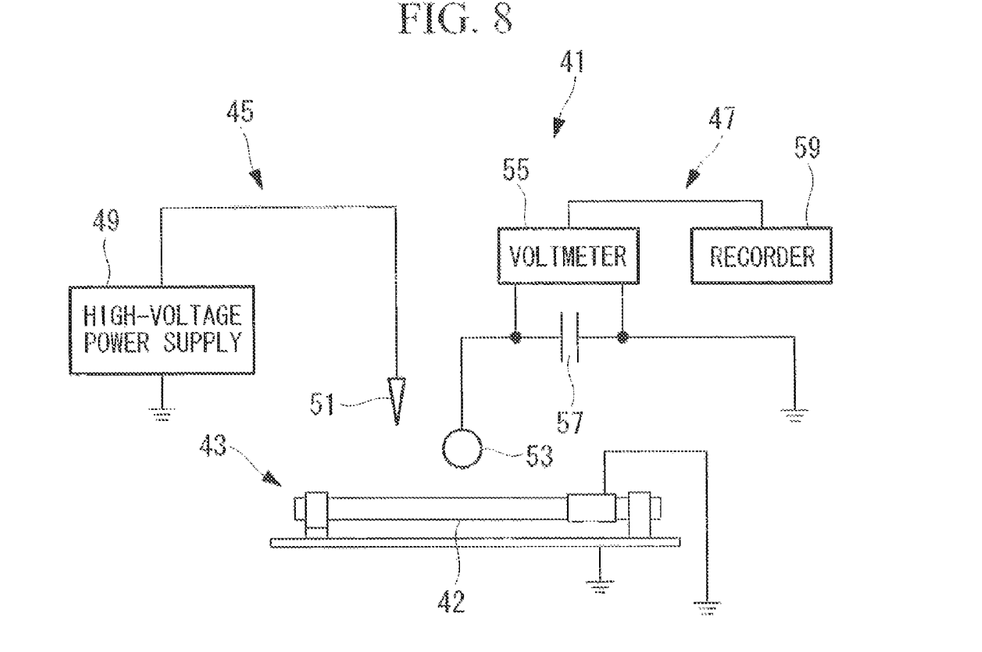
FIG. 8 is a schematic view of a testing device for testing the status of electrification in the fuel gauge in FIG. 2.

FIG. 8 is a schematic diagram showing, in outline, the configuration of a testing device 41. By means of a corona discharge, the testing device 41 electrifies a test piece 42, which simulates the fuel gauge 15 and is held by a holding portion 43, and then, causes an electric discharge from the test piece 42 and measures the discharge intensity.

The testing device 41 is provided with a corona electrification device 45 that electrifies the test piece 42 by imparting an electric charge thereto by means of a corona discharge and a discharge-intensity measuring device 47 that causes an electric discharge from the electrified test piece 42 to measure the discharge intensity at that time.

The corona electrification device 45 electrifies the outer structural body 23 of the fuel gauge 15 by releasing an electric charge from the high-voltage power source 49 as a corona discharge via a needle electrode 51.

In the discharge-intensity measuring device 47, a spherical electrode 53 is brought close to the outer structural body 23 of the fuel gauge 15 to apply an electric discharge thereto; a voltmeter 55 measures a voltage difference before and after a capacitor 57; and a recorder 59 records the result. The discharge intensity is calculated based on this voltage difference.

Figure 9:
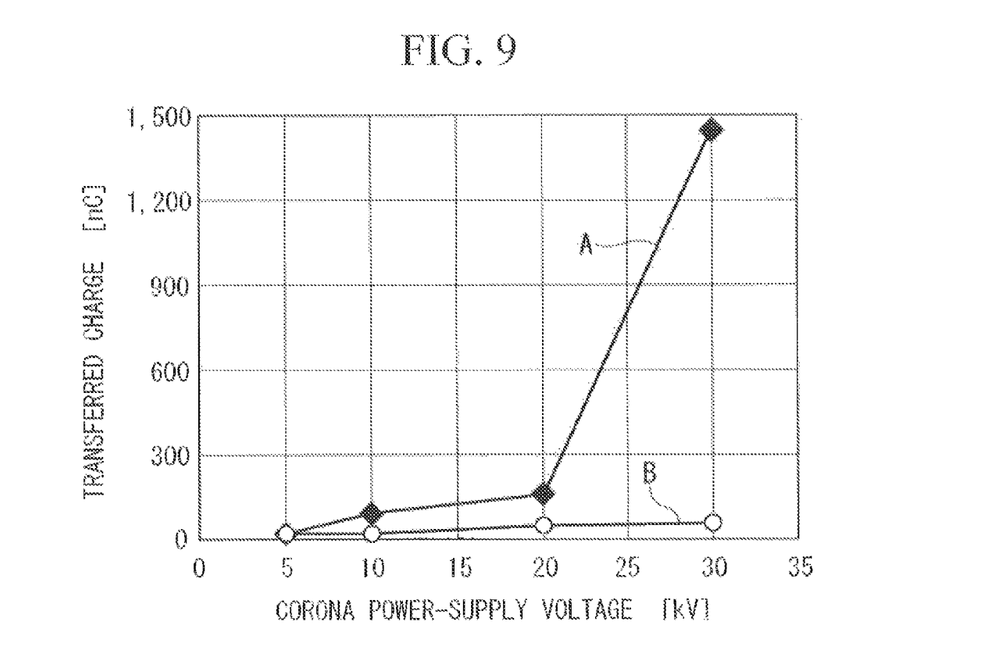
FIG. 9 is a graph for describing the transferred charge for the fuel gauge with respect to the power-supply voltage of a corona electrification device.

FIG. 9 is a graph describing the transferred charge for the fuel gauge 15 corresponding to a case in which the power-supply voltage in the corona electrification device is changed.

Graph A in FIG. 9 describes the transferred charge for the fuel gauge 15 without the outer through-holes 31, and graph B describes the transferred charge for the fuel gauge 15 of this embodiment.

Here, the electrification of the outer structural body 23 is caused by the corona discharge, and the voltage during the corona discharge ranges from 5 to 30 kV.

As indicated by graph A, the electrification caused by a corona discharge at a power-supply voltage of 30 kV resulted in a discharge intensity of about 1500 nC, which indicates that large electrification has occurred at the outer surface of the outer structural body 23, having a sufficient capability to ignite the fuel if an electric discharge occurs.

In contrast, as indicated by graph B, the electrification caused by the corona discharge at a power-supply voltage of 30 kV resulted in a discharge intensity of about 50 nC, which is about 1/30 in comparison with graph A, indicating that the electrification at the outer surface of the outer structural body 23 moves out of the system by passing through the outer through-holes 31, and the electrification is suppressed well.

Note that, in this embodiment, the inner structural body 27 has a hollow structure and the electrification occurring at the inner circumferential surface of the inner structural body 27 is allowed to escape toward the inner electrode 29 by means of the inner through-holes 33; however, in the case in which the inner structural body 27 has a solid structure, naturally, the inner through-holes 33 are not provided.

In addition, even if the inner structural body 27 has a hollow structure, the inner through-holes 33 may be omitted if the amount of fuel that exists in the hollow portion of the inner structural body 27 is low, and if the magnitude of the electrification due to streaming electrification does not reach a problematic level.

In addition, the technical scope of the present invention is not limited to the above-described embodiment, and it is possible to incorporate various alterations within a range that does not depart from the spirit of the present invention.

For example, although the present invention is employed in the fuel gauge 15 of an aircraft in the above-described embodiment, the present invention can be employed in a fuel gauge in transportation equipment such as an automobile or the like, without limitation to an aircraft.

In addition, the present invention can be employed in various types of tank that internally store a combustible material other than fuel, without limitation thereto.

REFERENCE SIGNS LIST

15 fuel gauge (capacitive level gauge)
23 outer structural body
25 outer electrode
27 inner structural body
29 inner electrode
31 outer through-hole (outer communicating portion)
33 inner through-hole (inner communicating portion)
35 outer conductor (outer communicating portion)
37 inner conductor (inner communicating portion)

The invention claimed is:

1. A capacitive level gauge comprising:
    an inner structural body having a columnar shape, the inner structural body being formed of an insulator;
    an outer structural body having a hollow-cylindrical shape, the outer structural body being formed of an insulator and disposed on the outer circumference side of the inner structural body over the entire circumference thereof and at a distance therefrom;
    an inner electrode that is attached to an outer circumferential surface of the inner structural body; and
    an outer electrode that is attached to an inner circumferential surface of the outer structural body, the capacitive level gauge measuring the capacitance between the inner electrode and the outer electrode and detecting the level of a measurement object that exists between the inner electrode and the outer electrode,
    wherein the outer structural body comprises a plurality of outer communicating portions each of which is provided in a direction from an outer circumferential surface thereof toward an axis of the hollow-cylindrical shape, and each of the outer communicating portions allows an electric charge to move from the outer circumferential surface thereof to the outer electrode.

2. A capacitive level gauge according to claim 1, wherein the outer communicating portions are formed of outer through-holes that penetrate through to the outer electrode from the outer circumferential surface of the outer structural body.

3. A capacitive level gauge according to claim 1, wherein the outer communicating portions are formed of outer conductors that reach the outer electrode from the outer circumferential surface of the outer structural body.

4. A capacitive level gauge according to claim 1, wherein:
    the inner structural body has a hollow structure inside of which the measurement object exists; and
    the inner structural body comprises a plurality of inner communicating portions each of which is provided in a direction from an outer circumferential surface thereof toward an axis of the columnar shape, and each of the inner communicating portions allows electric charge to move from an inner circumferential surface thereof to the inner electrode.

5. A capacitive level gauge according to claim 4, wherein the inner communicating portions are formed of inner through-holes that penetrate through to the inner electrode from the inner circumferential surface of the inner structural body.

6. A capacitive level gauge according to claim 4, wherein the inner communicating portions are formed of inner conductors that reach the inner electrode from the inner circumferential surface of the inner structural body.

* * * * *